(12) United States Patent
Leeson et al.

(10) Patent No.: US 10,658,823 B2
(45) Date of Patent: May 19, 2020

(54) HAND ASSIST PUSHING TOOL FOR CABLES

(71) Applicant: PPC BROADBAND FIBER LTD., Framlingham, Woodbridge (GB)

(72) Inventors: Kim Leeson, Ipswich (GB); Shaun Trezise, Aldeburgh (GB); Harvey Etheridge, Norfolk (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 16/150,265

(22) Filed: Oct. 2, 2018

(65) Prior Publication Data
US 2019/0131778 A1  May 2, 2019

Related U.S. Application Data

(60) Provisional application No. 62/626,279, filed on Feb. 5, 2018, provisional application No. 62/566,725, filed on Oct. 2, 2017.

(51) Int. Cl.
*H02G 1/08* (2006.01)
*G02B 6/54* (2006.01)
(Continued)

(52) U.S. Cl.
CPC ............... *H02G 1/08* (2013.01); *B65H 51/10* (2013.01); *B65H 59/18* (2013.01); *G02B 6/50* (2013.01);
(Continued)

(58) Field of Classification Search
CPC .......... H02G 1/08; H02G 1/081; H02G 1/088; H02G 1/204; H02G 1/1202; H02G 3/00
See application file for complete search history.

(56) References Cited

U.S. PATENT DOCUMENTS 4,106,754 A * 8/1978 Kucher .................... B66D 1/06
114/251
4,454,999 A * 6/1984 Woodruff ............... B65H 49/34
242/388.7
(Continued)

FOREIGN PATENT DOCUMENTS

CH         580344 A5   9/1976
DE       1 269 223 B   5/1968
(Continued)

OTHER PUBLICATIONS

Mar. 14, 2019 International Search Report issued in International Application No. PCT/IB2018/001221.

*Primary Examiner* — Lee D Wilson
(74) *Attorney, Agent, or Firm* — MH2 Technology Law Group, LLP

(57) ABSTRACT

A pushing tool for propelling cable into a duct. The pushing tool includes a drive wheel that is coupled with a base and a rotatable handle. A first cable guide and a second cable guide are configured to hold the cable. A duct guide is configured to hold the duct. Furthermore, a tension wheel is configured to interact with the drive wheel such that an orifice is formed between the tension wheel and the drive wheel, the orifice being configured to receive the cable. Upon rotation of the rotatable handle, the drive wheel interacts with the tension wheel to propel the cable into the duct.

20 Claims, 12 Drawing Sheets

(51) Int. Cl.
 *B65H 51/10* (2006.01)
 *B65H 59/18* (2006.01)
 *G02B 6/50* (2006.01)

(52) U.S. Cl.
 CPC ............... *G02B 6/54* (2013.01); *H02G 1/081* (2013.01); *H02G 1/085* (2013.01)

(56) References Cited

U.S. PATENT DOCUMENTS

| | | | | |
|---|---|---|---|---|
| 4,588,167 | A * | 5/1986 | Finzel | B66D 1/00 |
| | | | | 254/346 |
| 2005/0133772 | A1* | 6/2005 | Dow | B66D 1/04 |
| | | | | 254/341 |
| 2015/0197413 | A1* | 7/2015 | Doig | B66D 1/04 |
| | | | | 414/800 |

FOREIGN PATENT DOCUMENTS

| | | |
|---|---|---|
| FR | 2 175 296 A5 | 10/1973 |
| FR | 2 551 593 A1 | 3/1985 |
| WO | 2008/012780 A2 | 1/2008 |

\* cited by examiner

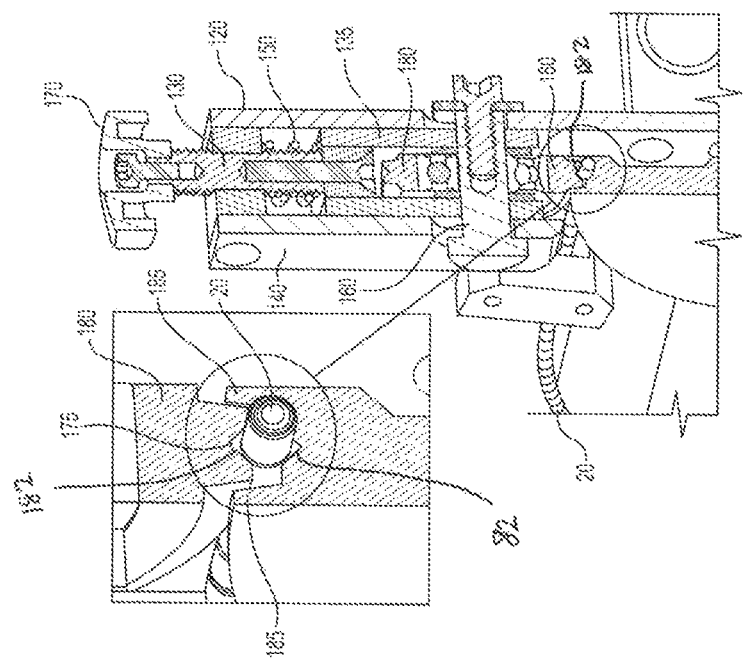
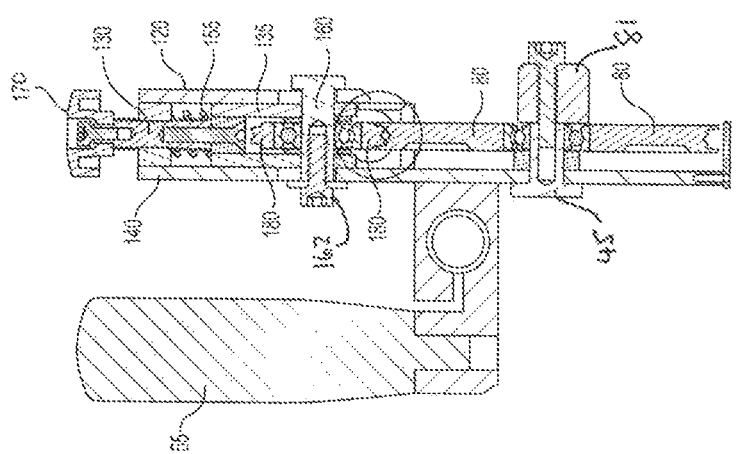
FIG. 3B
FIG. 3A

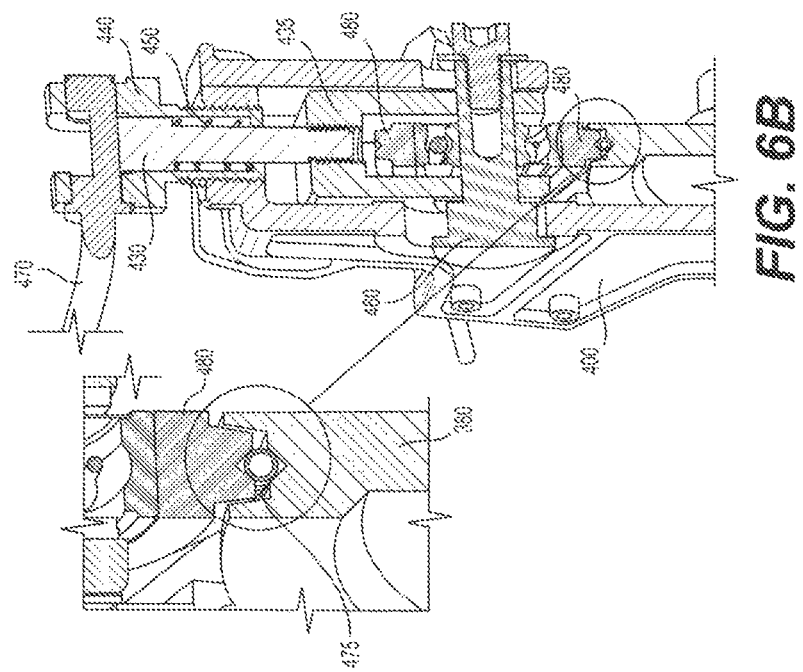
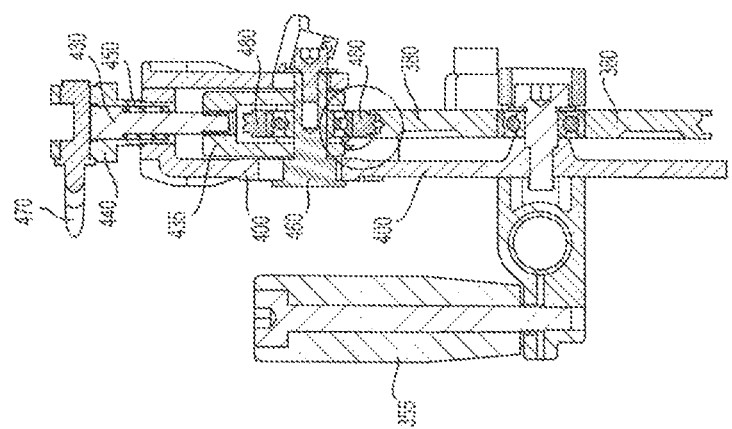
FIG. 6B
FIG. 6A

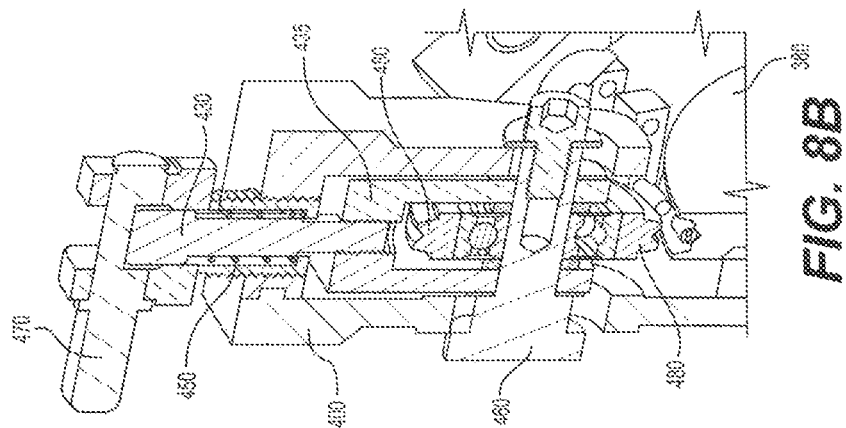
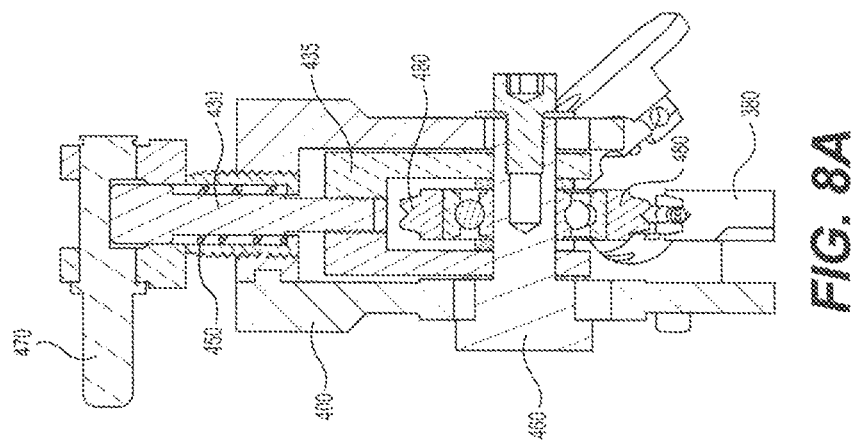

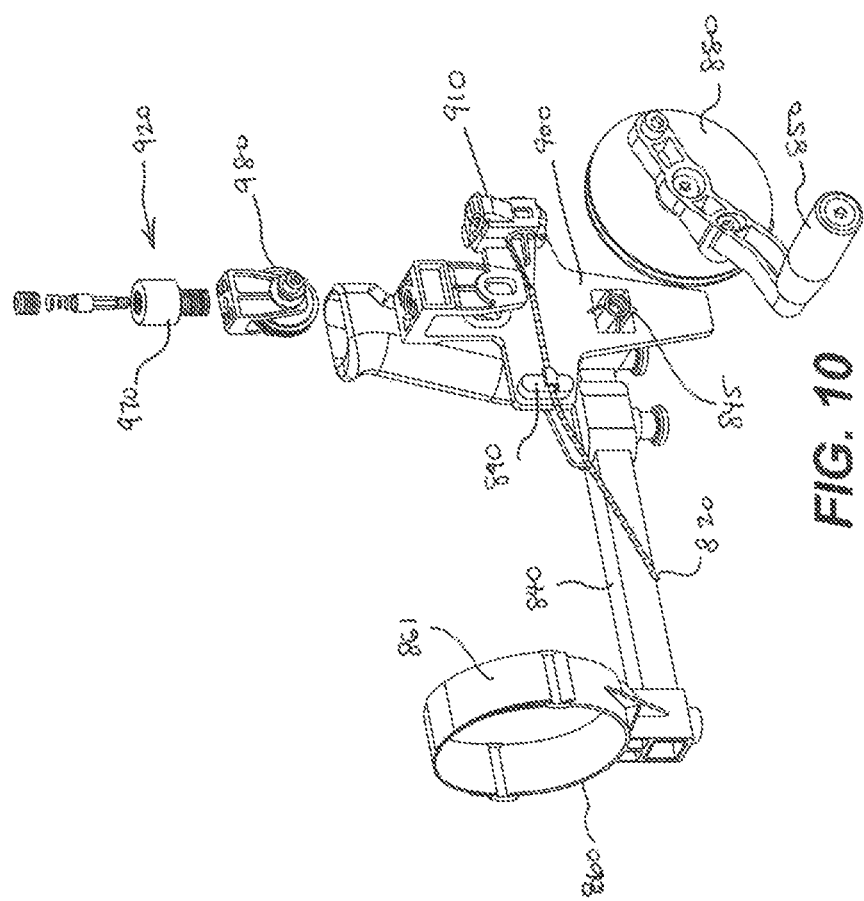

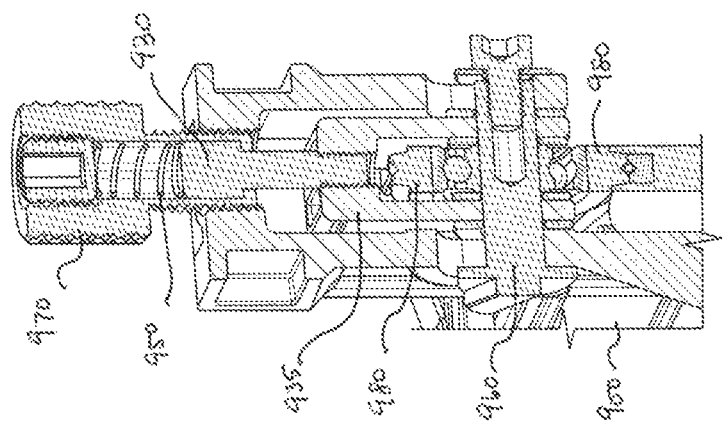
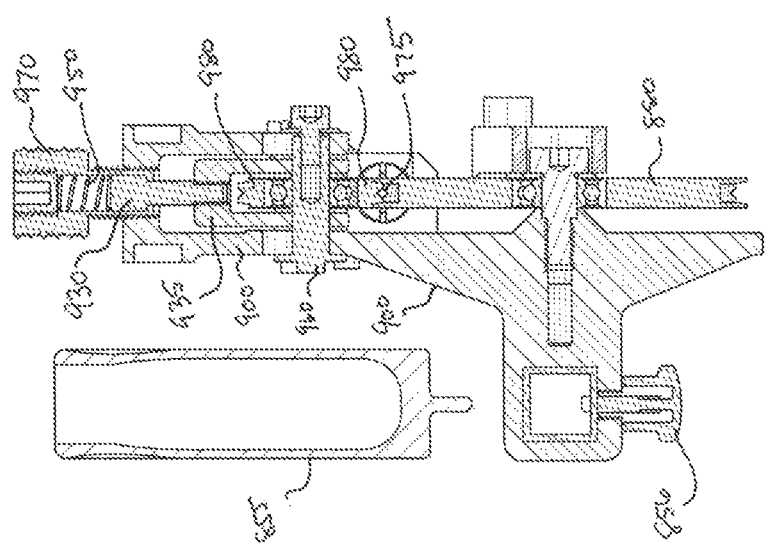

HAND ASSIST PUSHING TOOL FOR CABLES

CROSS-REFERENCE TO RELATED APPLICATIONS

This nonprovisional application claims the benefit of U.S. Provisional Application No. 62/626,279, filed Feb. 5, 2018, and U.S. Provisional Application No. 62/566,725, filed Oct. 2, 2017. The disclosures of the prior applications are hereby incorporated by reference herein in their entirety.

TECHNICAL FIELD

The present disclosure is directed to a hand assist pushing tool for cables, and more particularly for pushing fiber optical cables into a duct or conduit.

BACKGROUND

Installing fiber optical cables, for example, in a building or structure typically requires running the cables along a complex route. For example, the cables may be run underground or through ceilings, walls, or crawl spaces. Accordingly, it is conventional to use a duct to install the cables into the building or structure in order to protect the cables during the installation. However, the cables must be propelled through long and narrow ducts in order to reach the desired location. In some installations, the ducts are buried deep underground to provide added protection to the cables, which may be damaged if installed incorrectly. Furthermore, buried cables may be beneficial in urban areas or in harsh climate conditions. Placing the cables into the ducts and propelling the cables through the ducts can be costly and time consuming, particularly in complex installations.

Traditional methods for propelling fiber optic cables into ducts include pulling the cable with a winch rope. However, this technique is limited to short lengths and requires manpower at both ends of the duct. Other traditional methods include using pressurized fluid, blowing gas into the duct, or using an electrical or battery powered machine to propel the cables into and through the ducts. However, pressurized fluid and blown gas only allows the cables to be installed limited lengths within the ducts. Furthermore, electrical and battery powered machines are costly to produce and may be heavy to operate due to the bulky engine or battery pack required to operate such machines.

The disclosed system is directed to overcoming one or more of the problems set forth above and/or other problems of the prior art.

SUMMARY

The present disclosure is directed to a pushing tool for propelling cable into a duct. The pushing tool includes a drive wheel that is coupled with a base and a rotatable handle. A first cable guide and a second cable guide are configured to hold the cable. A duct guide is configured to hold the duct. Furthermore, a tension wheel is configured to interact with the drive wheel such that an orifice is formed between the tension wheel and the drive wheel, the orifice is configured to receive the cable. Upon rotation of the rotatable handle, the drive wheel interacts with the tension wheel to propel the cable into the duct.

According to various aspects, the pushing tool of the present disclosure may be a hand powered device that does not include a motor or a battery to propel the cable into the duct.

The pushing tool may further include a hand rest that is configured to pivot from a first side of the base to a second side of the base.

BRIEF DESCRIPTION OF THE DRAWINGS

FIGS. 3A and 3B are enlarged views illustrating a portion of the exemplary hand assist pushing tool of FIG. 1;

FIGS. 6A and 6B are enlarged views illustrating a portion of the exemplary hand assist pushing tool of FIG. 4;

FIGS. 8A and 8B are enlarged views illustrating a portion of the exemplary hand assist pushing tool of FIG. 4;

FIG. 10 is an exploded view of the exemplary hand assist pushing tool of FIG. 9;

FIGS. 11A and 11B are enlarged views illustrating a portion of the exemplary hand assist pushing tool of FIG. 9.

DETAILED DESCRIPTION OF EMBODIMENTS

Figure 1:
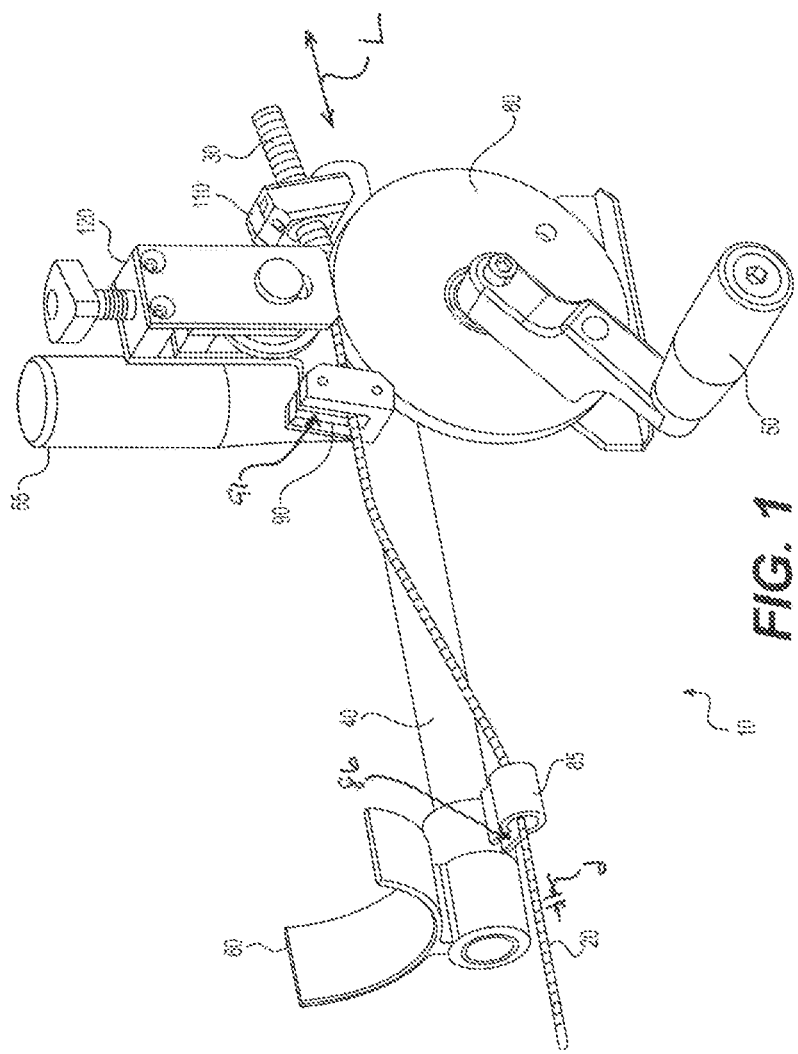
FIG. 1 is a diagrammatic illustration of an exemplary hand assist pushing tool in accordance with various aspects of the disclosure.

FIG. 1 illustrates an exemplary disclosed hand assist pushing tool 10 in accordance with various aspects of the disclosure. The pushing tool is operable to introduce cable 20 into and through a duct 30. Cable 20 may be any conventional wire or cable including, for example, fiber optic cables, power cables, or electrical conductive wires. Duct 30 may include any enclosed canal, conduit, tubing, or other enclosed stricture in which cable is typically inserted. Cable 20 and duct 30 may each be of standard lengths and diameters, as is well known in the industry.

Figure 2:
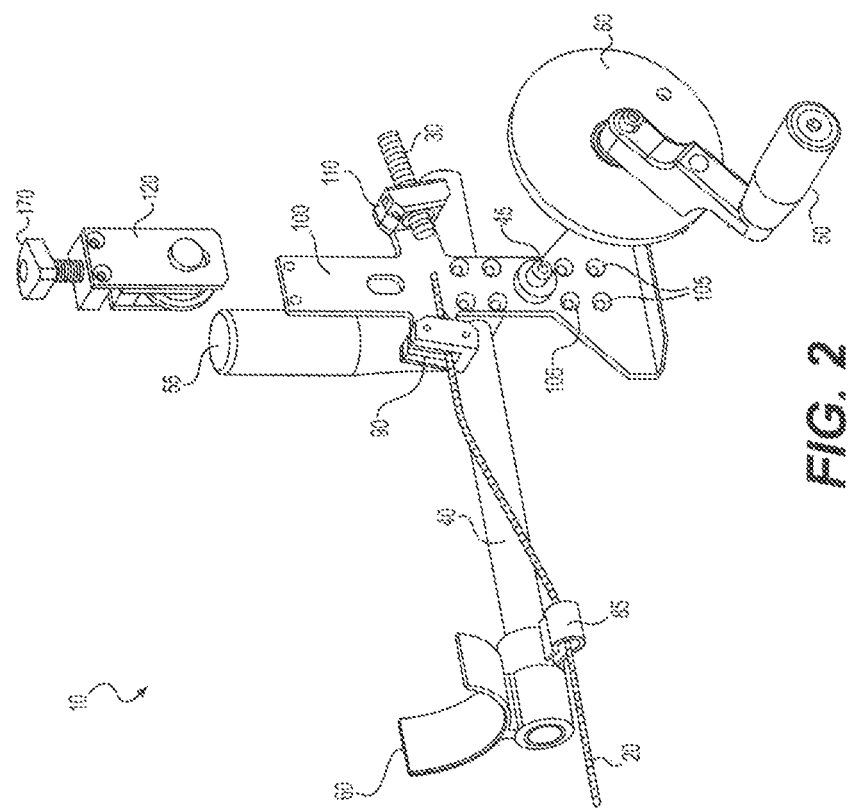
FIG. 2 is an exploded view of the exemplary hand assist pushing tool of FIG. 1.

As shown in FIGS. 1 and 2, the pushing tool 10 includes a base 40, a mount 100, a drive wheel 80, and a tensioning member 120. The mount 100 is configured to be fixedly mounted to the base 40 such that the mount 100 does not rotate or translate relative to the base 40. The base 40 may be hollow in order to provide a lightweight design of the pushing tool 10. Alternatively, the base 40 may be a solid member in order to provide increased durability to the pushing tool 10.

A stationary handle 55, an arm rest 60, and a first cable guide 85 may be coupled to the base 40. The stationary handle 55, the arm rest 60, and the first cable guide 85 may be adjustably coupled to the base 40 by any conventional method such as, for example, an interference fit, a clamping arrangement, a threaded set screw, or the like. In some embodiments, the stationary handle 55, the arm rest 60, and the first cable guide 85 may be coupled with the base 40 such that the stationary handle 55, the arm rest 60, and the first cable guide 85 do not move relative to the base 40 during operation of the pushing tool 10.

A drive wheel 80 is configured to be coupled with the mount 100 such that the drive wheel 80 is capable of rotating relative to the mount 100. For example, the drive wheel 80 may be rotatably coupled relative to a shaft 45 extending from the mount 100. The mount 100 may include a bearing or bushing configured to cooperate with a hub of the drive wheel 80 in order to provide smooth rotation of the drive wheel 80 relative to the mount 100. The drive wheel 80 may be removably coupled with the mount 100 by a coupling member 81 that cooperates with the shaft 45 or any other conventional means such that the drive wheel 80 remains coupled with the mount 100 during operation of the pushing tool 10.

A rotatable handle 50 may be coupled with the drive wheel 80 such that the rotatable handle 50 is rotatable with the drive wheel 80 relative to the mount 100 and the base 40. Thus, the rotatable handle 50 can be used to operate a drive wheel 80. The drive wheel 80 may be comprised of metal, for example, aluminum.

The drive wheel 80 may cooperate with the first cable guide 85 and a second cable guide 90, which is coupled with the mount 100, to guide cable 20 into duct 30. It is also envisioned that only a single one of the cable guides 85, 90 may be used or a more than two cable guides (e.g., three, five, etc.) may be used with pushing tool 10. The first cable guide 85 and the second cable guide 90 may each include an slot 86, 91 into which the cable 20 may be inserted. In the exemplary disclosed embodiments, the slot 86 of the first cable guide 85 extends transverse to the slot 91 of the second cable guide 90. In some aspects, the first cable guide 85 may be disposed at angle of, for example, 90° relative to the second cable guide 90.

FIGS. 1 and 2 illustrate the pushing tool 10 with the rotatable handle 50, the stationary handle 55, and the arm rest 60 arranged in a right hand configuration. That is, during use, a user may, for example, place his left forearm in arm rest 60 and grip stationary handle 55 with his left hand while operating the rotatable handle 50 with his right hand. It should be appreciate that the arm rest 60 may be rotated relative to the base 40, for example, by 180°, so that, in some embodiments, the arm rest 60 may move from a first side of the base 40 to a second side of the base 40 relative to a longitudinal direction L of the base 40. Additionally, the stationary handle 55 may be rotated with regard to base 40, for example, by 180°, so that, in some embodiments, the stationary handle 55 may move from the first side of the base 40 to the second side of the base 40. In some embodiments, the arm rest 60 and the stationary handle 55 may be configured to move together. Such movement of arm rest 60 and stationary handle 55 may allow both a right-handed user and a left-handed user to operate pushing tool 10. Accordingly, after arm rest 60 and stationary handle 55 are rotated around base 40, the user may, for example, place his right forearm in arm rest 60 and grip stationary handle 55 with his right hand while operating rotatable handle 50 with his left hand. Rotation of arm rest 60 around base 40 may be completed by pivoting arm rest 60 from the first side of base 40 to the second side of base 40. Rotation of stationary handle 55 around base 40 may be completed by pivoting stationary handle 55 from the first side of base 40 to the second side of base 40.

The drive wheel 80 may include one or more ridges/notches along its outer circumferential surface that apply pressure points on cable 20 to reduce slippage of cable 20 in the pushing tool 10. As discussed further below, the outer circumferential surface 82 of the drive wheel 80 may form a v-shape. Thus, the ridges on drive wheel 80 may be disposed in a direction transverse to the circumferential direction of the drive wheel 80 along the v-shaped outer surface. In some aspects (or embodiments), the ridges on drive wheel 80 may be spaced apart to match the spacing of complementary grooves of a cable, such as for example, a MiniFlex® grooved cable. For example, the centers of the ridges may be spaced apart by the same distance d as the distance d between consecutive grooves of the cable. Alternatively, the ridges may be spaced apart by a distance nd, where n is a whole number, and d is the distance between consecutive grooves of the cable. The ridges on drive wheel 80 may interact with the grooves on the cable to reduce slippage of the cable.

As shown in FIG. 2, the mount 100 may include one or more openings 105 through which the shaft 45 may be inserted. Such openings 105 allow the rotatable handle 50 (and, thus, drive wheel 80) to be disposed at various positions on the pushing tool 10 to accommodate users of varying sizes. The second cable guide 90 may be integral with the mount 100. In some embodiments, the second cable guide 90 and the mount 100 form one unitary member. In alternative embodiments, the second cable guide 90 may be secured to the mount 100 using any conventional securing mechanism.

The mount 100 may also include a duct guide 110 through which duct 30 may be disposed. Duct guide 110 may include an aperture sized so that the duct 30 may be securely positioned within duct guide 110. For example, the duct guide 110 may be a quick release connector, as would be understood by persons skilled in the art. As shown in FIG. 2, the duct guide 110 may be disposed on an opposite end of the mount 100 from the second cable guide 90. The duct guide 110 may be integral with mount 100 in some embodiments such that the duct guide 110 and mount 100 form one unitary member. In alternative embodiments, the duct guide 110 may be secured to mount 100 using any conventional securing mechanism.

Referring now to FIGS. 3A and 3B, the tensioning assembly 120 is coupled with the mount 100 via a pin 160 and coupling member 162. In other embodiments, the tensioning assembly 120 may be secured to the mount 100 through any conventional securing mechanism. As shown in FIGS. 3A and 3B, tensioning assembly 120 includes a threaded shaft 130 and a moveable connector 135, which is mounted to the pin 160 for vertical movement relative to a housing 140. A tension wheel 180 is mounted to the pin 160 for rotation relative to the pin 160 and the housing 140.

The tensioning assembly 120 includes actuator 170 that is configured to adjust a tension force on the tension wheel 180, which in turn adjusts the force that the tension wheel 180 applies to the cable 20 that is fed between the outer circumferential surface 82 of the drive wheel 80 and the tension wheel 180. The actuator 170 is fixedly coupled with movable connector 135 for vertical movement therewith. Additionally, tensioning assembly 120 may include a spring member 150. The tensioning assembly 120 may be secured on the pushing tool 10 so that the tension wheel 180 forms an opening 175 with the drive wheel 80. Cable 20 may be disposed within the opening 175 as the cable 20 is propelled into duct 30.

Actuator 170 may be manipulated (for example, by manually screwing actuator 170 relative to housing 140) so that actuator 170 may move in a downward direction or an upward direction relative to housing 140. Actuator 170 may be moved downward (closer to drive wheel 80) and upward (further from drive wheel 80) with regard to housing 140. Upon movement of actuator 170 in the downward direction, threaded shaft 130 may also move in the downward direction with actuator 170. Such downward movement of threaded shaft 130 may cause moveable connector 135 to also move in the downward direction, which in turn causes the pin 160 to move in the downward direction. Such movement then causes tension wheel 180 to move downward and toward drive wheel 80 so that the size of the opening 175 is relatively smaller.

Conversely, movement of actuator 170 in the upward direction may cause threaded shaft 130, moveable connector 135, and pin member 160 to also move upward. Such movement may then cause tension wheel 180 to move upward and away from drive wheel 80 so that the size of the opening 175 is relatively larger. Therefore, movement of actuator 170 may be used to control the size of the opening 175. Such movement allows for different sized cables to be disposed through the opening 175. Additionally, such movement allows the tension wheel 180 to apply a desired amount of tension on the cable 20 when cable 20 is being propelled through duct 30.

As also shown in FIGS. 3A and 3B, spring member 150 on tensioning assembly 120 may bias moveable connector 135 in the downward direction. Such bias may help to apply the desired amount of tension on cable 20.

During use, cable 20 is disposed within the opening 175 with the cable 20 also aligned with the duct 30. As discussed above, manipulation of actuator 170 may cause a downward movement of tension wheel 180 toward drive wheel 80. Thus, when cable 20 is disposed in the opening 175 between tension wheel 180 and drive wheel 80, tension wheel 180 applies a desired downward pressure on cable 20.

As shown in FIGS. 3A and 3B, the opening 175 is formed by a v-shaped outer surface 182 of tension wheel 180 and a v-shaped outer surface 82 of drive wheel 80. The cable 20 is secured in the opening 175 due to a desired gripping force of the v-shaped outer surfaces of the wheels 80, 180, and cable 20 is fed into duct 30. A user can then rotate the rotatable handle 50 which is turn rotates the drive wheel 80 relative to the mount 100. As the drive wheel 80 is rotated, the interaction of tension wheel 180 and drive wheel 80 with the cable 20 propels cable 20 forward and into duct 30. Thus, the interaction of tension wheel 180 and drive wheel 80 prevents or reduces cable 20 from moving backward away from duct 30.

Tension wheel 180 and drive wheel 80 may form a complimentary and interlocking engagement within the opening 175. For example, as shown in FIG. 3B, drive wheel 80 may include outer edges 185 that radially overlap with tension wheel 180. Furthermore, outer edges 185 of drive wheel 80 may be radially outward of tension wheel 180 when tension wheel 180 is engaged with cable 20. This complimentary and interlocking engagement between tension wheel 180 and drive 80 may allow the wheels to be easily and properly aligned during use.

It is also envisioned that the outer surface of tension wheel 180 and of drive wheel 80 may comprise other shapes than a v-shape. For example, these outer surfaces may comprise a rectangular, square, circular, oval, or elliptical shape. Additionally, in some embodiments, the outer surfaces may be chamfered along one or more edges. For example, outer edges 185 of drive wheel 80 may be chamfered. It is also within the scope of the disclosure that the outer surface of tension wheel 180 comprises a different shape from the outer surface of drive wheel 80.

Actuator 170 may be lowered and raised relative to drive wheel 80. Accordingly, as discussed above, actuator 170 may be lowered during an operation state so that tension wheel 180 applies a downward pressure on cable 20 that is disposed within orifice 175. Furthermore, actuator 170 may be raised during an inactive state so that tension wheel 180 no longer applies the downward on pressure on cable 20 that is disposed within orifice 175.

FIGS. 4-8B are directed to a second embodiment of a hand assist pushing tool 300. With regard to the second embodiment, descriptions of structures are omitted that are similar to those described above for the first embodiment.

Figure 4:
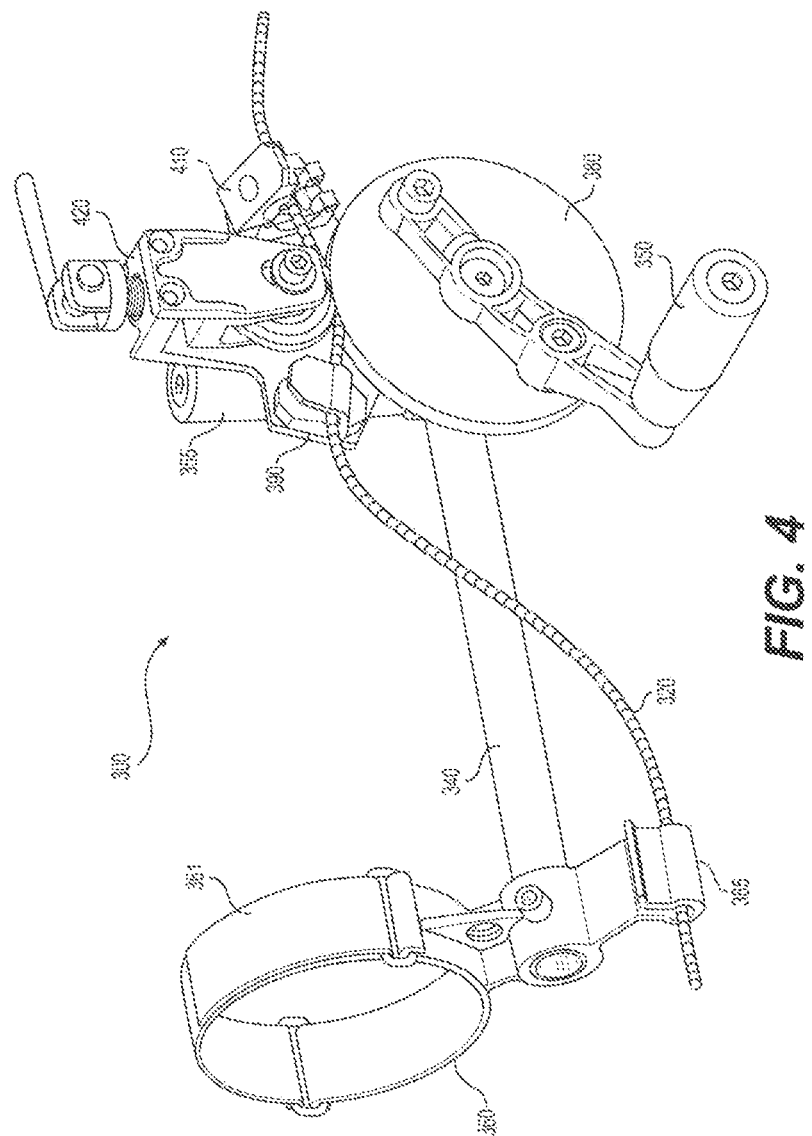
FIG. 4 is a diagrammatic illustration of an exemplary hand assist pushing tool in accordance with various aspects of the disclosure.

Similar to the first embodiment, the second embodiment is used for introducing cable 320 into and through a duct (not shown in FIG. 4). As shown in FIG. 4, pushing tool 300 may include a base 340 that is coupled with a rotatable handle 350, a stationary handle 355, and an arm rest 360. During use, a user may, for example, place his left forearm in arm rest 360 and grip stationary handle 355 with his left hand while operating rotatable handle 350 with his right hand. Arm rest 360 may be circular with a strap 361 to accommodate different sized arms. Thus, strap 361 may be used to form different sizes of arm rest 360, and may be secured in a desired position with an adhesive, Velcro, snaps, or any other well-known attachment means. Additionally, strap 361 may enable a user to form a tight fit between arm rest 360 and a user's arm.

As shown in FIG. 4, pushing tool 300 includes a first cable guide 385 and a second cable guide 390. A drive wheel 380 may be used with first cable guide 385 and second cable guide 390 to propel cable 320 into the duct. As discussed further below, tensioning assembly 420 may also be used to propel cable 320.

Figure 5:
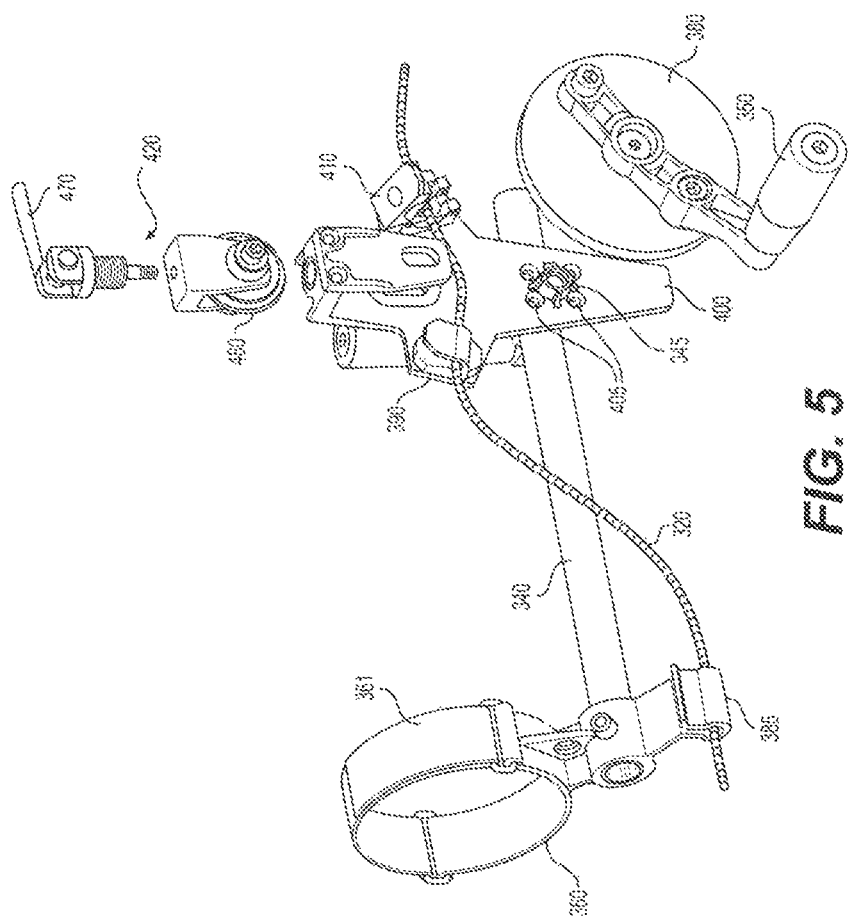
FIG. 5 is an exploded view of the exemplary hand assist pushing tool of FIG. 4.
Figure 7A:
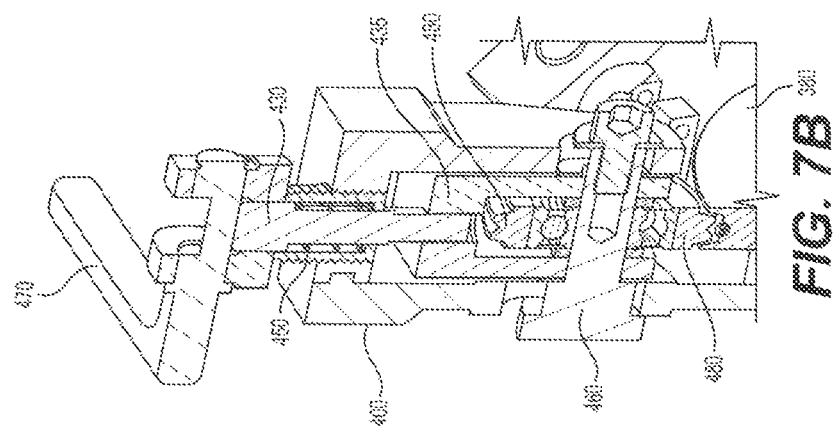
FIGS. 7A and 7B are enlarged views illustrating a portion of the exemplary hand assist pushing tool of FIG. 4.
Figure 7B:
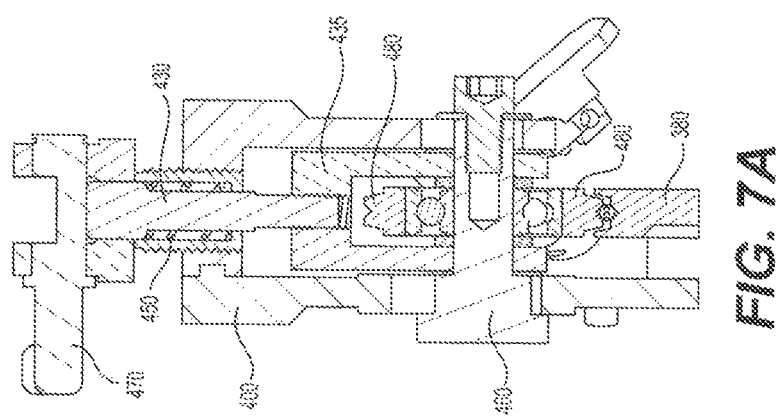

As shown in FIG. 5, a mount 400 may be coupled with base 340 to secure rotatable handle 350 and drive wheel 380 to base 340. Thus, shaft 345 may be disposed through rotatable handle 350 and through mount 400 so that drive wheel 380 rotates relative to base 340 due to rotation of rotatable handle 350. Mount 400 may include one or more openings 405 through which shaft 345 may be inserted. Such openings 405 allow rotatable handle 350 (and, thus, drive wheel 380) to be disposed at various positions on pushing tool 10 to accommodate users of varying sizes.

Mount 400 may also include a duct guide 410 through which the duct may be disposed. Duct guide 110 may include an aperture sized so that the duct may be securely positioned within duct guide 410.

Tensioning assembly 420 may be coupled with base 340 through mount 400. As shown in FIGS. 6A and 6B, tensioning assembly 420 includes a shaft 430, a spring member 450, a threaded member 440, a cam lever 470, and a tension wheel 480. Shaft 430 may be coupled with tension wheel 480 through a moveable connector 435 and a pin member 460. Thus, movement of shaft 430 may also cause movement of moveable connector 435, pin member 460, and tension wheel 480.

Threaded member 440 may be manipulated by a user, for example, by manually screwing threaded member 440 relative to mount 400. Thus, threaded member 440 may be moved to multiple positions by moving downward and upward relative to mount 400. Movement of threaded member 440 relative to mount 400 may cause tension wheel 480 to form different sized orifices 475 with drive wheel 380. For example, movement of threaded member 440 upward may form a relatively larger orifice 475, and movement of threaded member 440 downward, may form a relatively smaller orifice 475. Thus, movement of threaded member 440 may accommodate for different sized cables 320.

Once threaded member 440 is set in the desired position, cam lever 470 may move from a first, unlocked position to a second, locked position. FIGS. 6A-7B show cam lever 470 in the locked position and FIGS. 8A and 8B show cam lever 470 in the unlocked position. Movement of cam lever 470 to the locked position may cause shaft 430 to move downwards to engage tension wheel 480. More specifically, shaft 430 may move downward (closer to drive wheel 380). Such downward movement of shaft 430 may cause moveable connector 435 to also move in the downward direction, which in turn may cause pin member 460 to move in the downward direction. This downward movement may cause tension wheel 480 to move downward and toward drive wheel 380 so that cable 320 is securely positioned within orifice 475. As discussed above, the size of orifice 475, when tension wheel 480 is moved to the downward position, may be determined by the position of threaded member 440.

Tension wheel 480 and drive wheel 380 may form a complimentary and interlocking engagement within orifice 475 in order to propel cable 320 into the duct. Additionally, the downward force on tension wheel 480 may allow tension wheel 480 to apply a sufficient amount of tension on cable 320 when cable 320 is being propelled through the duct.

Movement of cam lever 470 from the second, locked position to the first, unlocked position may release the pressure exerted on cable 320 from tension wheel 480. Thus, shaft 430 may move upward, relative to drive wheel 380 so that tension wheel 480 releases at least some pressure on cable 320. Spring member 450 may be a return spring that aids to move shaft 430 upward, relative to drive wheel 380. Due to the upward movement of shaft 430, pin member 450 and moveable member 435 may also move upward.

Additionally, threaded member 440 may be maintained in the set position when cam lever 470 is moved from the first, unlocked position to the second, locked position. Therefore, the size of orifice 475, when tension wheel 480 is in the downward position, is maintained in a set position when cam lever 470 is moved from the first, unlocked position to the second, locked position. For example, a user can set the desired position of threaded member 440 (and thus of orifice 475 when tension wheel 480 is in the downward position), propel a first cable into a first duct, move to a different location, and then propel a second cable into a second duct while the position of threaded member 440 remains set in the desired position. Therefore, the size of orifice 475 also remains the same. Such may be advantageous if the first and second cables are of the same size, so that the user does not have to readjust the position of threaded member 440.

Movement of cam lever 470 between the first and second positions allows for a quick release of tension wheel 480 from drive wheel 380. Thus, tension wheel 480 may be quickly released from engagement with drive wheel 380.

FIGS. 9-12 are directed to a third embodiment of a hand assist pushing tool 800. With regard to the second embodiment, descriptions of structures are omitted that are similar to those described above for the first embodiment.

Figure 9:
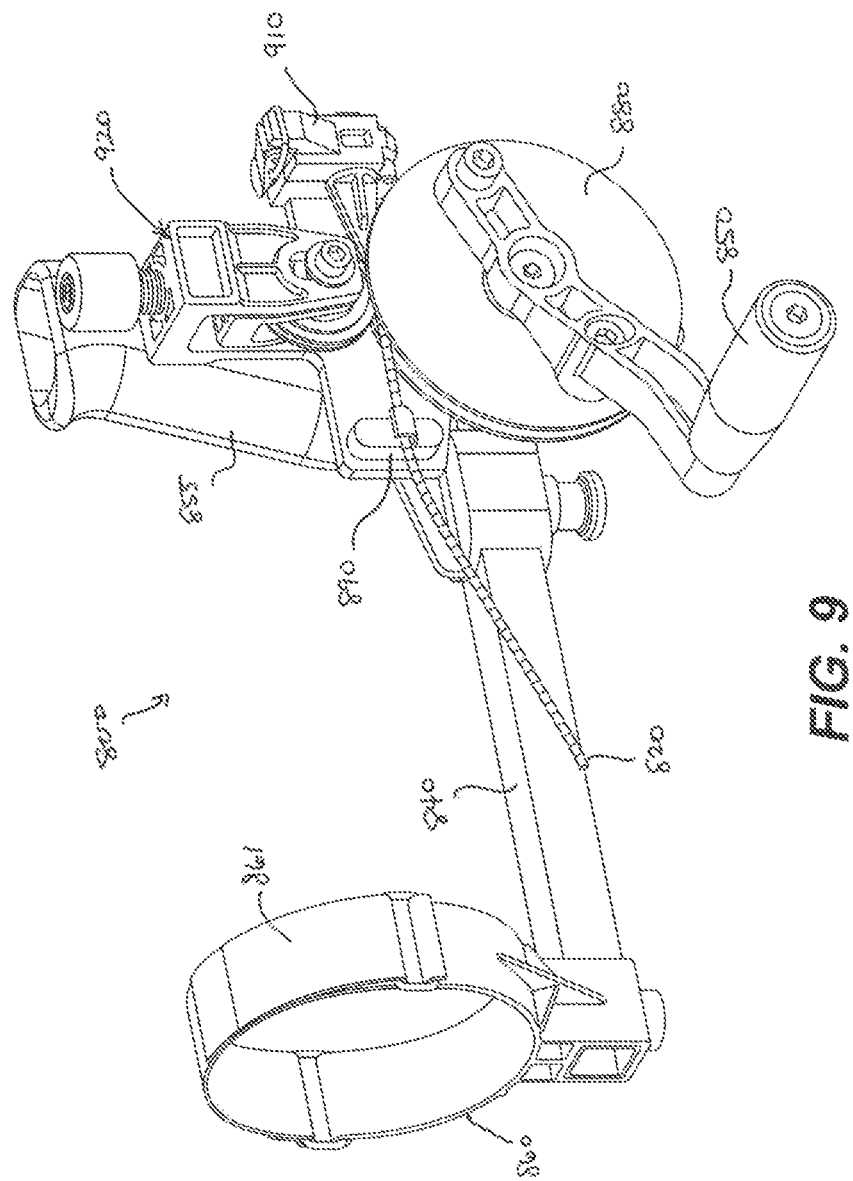
FIG. 9 is a diagrammatic illustration of an exemplary hand assist pushing tool in accordance with various aspects of the disclosure.
Figure 12:
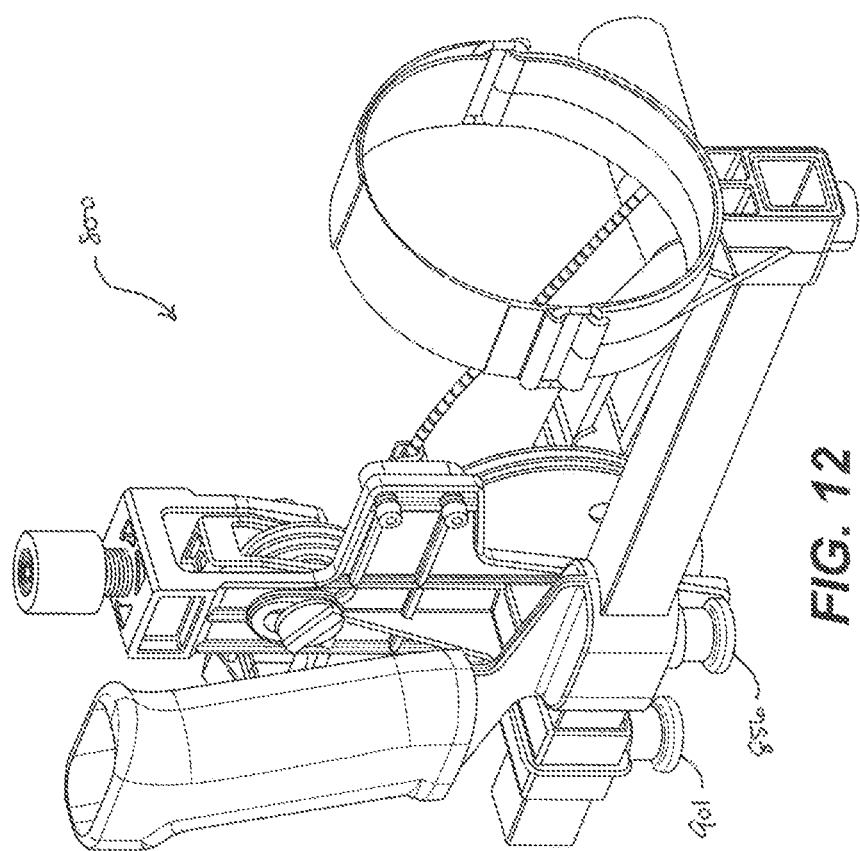
FIG. 12 is another diagrammatic view of the exemplary hand assist pushing tool of FIG. 9.

Similar to the first embodiment, the second embodiment is used for introducing cable 820 into and through a duct (not shown in FIG. 9). As shown in FIG. 9, pushing tool 800 may include a base 840 that is coupled with a rotatable handle 850, a stationary handle 855, an arm rest 860, and a mount 900. The base 840 is configured as a square tube to prevent rotation of the stationary handle 855, the arm rest 860, and the mount 900 relative to the base 840. Spring pins 856, 901 may be configured to couple the stationary handle 855 and the mount 900, respectively, to the base 860 such that the stationary handle 855 and mount 900 cannot translate along the length of the base 840. During use, a user may, for example, place his left forearm in arm rest 860 and grip stationary handle 855 with his left hand while operating rotatable handle 850 with his right hand. Arm rest 860 may be circular with a strap 861 to accommodate different sized arms. Thus, strap 861 may be used to form different sizes of arm rest 860, and may be secured in a desired position with an adhesive, Velcro, snaps, or any other well-known attachment means. Additionally, strap 861 may enable a user to form a tight fit between arm rest 860 and a user's arm.

As shown in FIG. 9, pushing tool 800 includes a cable guide 890. A drive wheel 880 may cooperate with the cable guide 890 to direct the cable 820 into the duct. As discussed further below, tensioning assembly 920 may also be used to propel cable 820.

As shown in FIG. 10, a mount 900 may be coupled with base 840 to secure rotatable handle 850 and drive wheel 880 to base 840. Thus, shaft 845 may be disposed through rotatable handle 850 and through mount 900 so that drive wheel 880 rotates relative to base 840 due to rotation of rotatable handle 850.

Mount 900 may also include a duct guide 910 through which the duct may be disposed. Duct guide 910 may include an aperture sized so that the duct may be securely positioned within duct guide 910.

Tensioning assembly 920 may be coupled with base 840 through mount 900. As shown in FIGS. 11A and 11B, tensioning assembly 920 includes a shaft 930, a spring member 950, an actuator 970, and a tension wheel 980. Shaft 930 may be coupled with tension wheel 980 through a moveable connector 935, for example, via threaded connection, and a pin member 960. Thus, movement of shaft 930 may also cause movement of moveable connector 935, pin member 960, and tension wheel 980.

A threaded member 940, such a grub screw, is threaded into the actuator and loads the spring member 950 with a force against the shaft 930. The actuator 970 may be manipulated by a user, for example, by manually turning the actuator relative to mount 900. Thus, actuator 970 may be moved to multiple positions by moving downward and upward relative to mount 900. Movement of actuator 970 relative to mount 900 may cause tension wheel 980 to form different sized orifices 975 with drive wheel 880. For example, movement of actuator 970 upward may form a relatively larger orifice 975, and movement of actuator 970 downward, may form a relatively smaller orifice 975. Thus, movement of threaded member 940 may accommodate for different sized cables 820.

Such downward movement of actuator 970 causes the shaft 930 to be urged downward under force of the spring 950, which causes the moveable connector 935 to also move in the downward direction, which in causes pin member 960 to move in the downward direction. This downward movement causes the tension wheel 980 to move downward and toward drive wheel 880 so that cable 820 is securely positioned within orifice 975. As discussed above, the size of orifice 975, when tension wheel 980 is moved to the downward position, may be determined by the position of actuator 970.

Tension wheel 980 and drive wheel 880 may form a complimentary and interlocking engagement within orifice 975 in order to propel cable 820 into the duct. Additionally, the downward force on tension wheel 980 may allow tension wheel 980 to apply a desired amount of tension on cable 820 when cable 820 is being propelled through the duct.

Movement of cam lever 970 between the first and second positions allows for a quick release of tension wheel 980 from drive wheel 880. Thus, tension wheel 980 may be quickly released from engagement with drive wheel 880.

In some embodiments, pushing tool 10/300/800 may be used with a support structure 190, such as a tripod structure to provide added stability. Support structure may include legs that are disposed on the ground and arms that receive pushing tool 10.

In some embodiments, duct guide 110/410/810 may include one or magnets 200/500/900 that are attracted to duct 30 to further stabilize duct 30 within duct guide 110/410/910. More specifically, when cable 20/320/820 is propelled into and through duct 30, such propulsion applies a backward force on duct 30, away from duct guide 110/410/910. Thus, duct 30 may inadvertently become displaced from duct guide 110/410/910. Accordingly, magnets 200/500/900 help to further secure duct 30 within duct guide 110/410/910 so that duct 30 does not become inadvertently displaced from duct guide 110/410/910.

Pushing tool 10/300/900 may be disposed within a carrying bag 210 in order to easily transport pushing tool 10. Carrying bag 210 may include a strap and/or wheels.

In use, cable 20 is disposed into and through first cable guide 85/385/885 and second cable guide 90/390/890, and an end of duct 30 is secured in duct guide 110/410/910. Tensioning assembly 120/420/920 is attached to mount 100/400/900 so that cable 20/320/820 is disposed within orifice 175/475/975. The user manipulates tensioning assembly 120/420/920 so that cable 20/320/820 is secured in orifice 175/475/975 between tension wheel 180/480/980 and drive wheel 80/380/880. When the user rotates rotatable handle 50, the v-shaped outer surface of tension wheel 180/480/980 and the v-shaped outer surface of drive wheel 80/380/880 engage cable 20/320/820 and cause cable 20/320/820 to be fed through and into duct 30. More specifically, tension wheel 180/480/880 and drive wheel 80/380/880 interact to grip cable 20/320/820, causing cable 20/320/820 to be propelled into duct 30. The interaction of tension wheel 180/480/980 and drive wheel 80/380/880 also prevents or reduces cable 20/320/820 from moving backward away from duct 30.

Thus, pushing tool 10/300/800 may be a hand powered device that does not include the use of a motor or battery to propel cable 20/320/820 into duct 30. Such provides a relatively smaller apparatus with reduced manufacturing costs from the conventional electric motor or battery powered apparatuses. In some embodiments, pushing tool 10/300/800 may be a hand powered device that includes a simple motor attached to drive wheel 80/380/880. Such allows provides a smaller apparatus with reduced manufacturing costs. Additionally, the simplicity of pushing tool 10/300/800 allows cable 20/320/820 to be easily advanced into duct 30 on location with a minimal number of users and with no external power requirements.

Drive wheel 80/380/880 may be of sufficient diameter so that cable 20/320/820 may be propelled into duct at one foot per revolution of drive wheel 80/380/880.

Pushing tool 10/300/800 may also be used to pull cable 20/320/820 out of duct 30 by rotating drive wheel 80/380/880 in an opposite direction to the direction of inserting cable 20/320/820.

It will be apparent to those skilled in the art that various modifications and variations can be made to the system of the present disclosure. Other embodiments of the pushing tool will be apparent to those skilled in the art from consideration of the specification and practice of the method disclosed herein.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A pushing tool for feeding cable into a duct, the pushing tool comprising:
    an elongated base having a length extending in a longitudinal direction from a first end to a second end;
    an arm rest configured to be adjustably coupled along the length of the base proximate the first end;
    a mount configured to be adjustably coupled with the base proximate the second end;
    a handle configured to be adjustably coupled with the base between the arm rest and the mount;
    a drive wheel rotatingly coupled with the mount;
    a tension wheel rotatingly coupled with the mount, the tension wheel being configured to cooperate with the drive wheel to form a cable path between the tension wheel and the drive wheel, the cable path being configured to receive the cable;
    a tensioner coupled with the tension wheel, the tensioner including an actuator configured to adjust tension of the tension wheel on the cable being fed through the cable path;
    a cable guide configured to guide the cable toward the cable path; and
    a duct guide configured to hold the duct, which is configured to receive the cable,
    wherein the base is configured to prevent the stationary handle, the arm rest, and the mount from rotating relative to the base and the stationary handle, the arm rest, and the mount are configured to be fixed along the length of the base during use of the tool,
    wherein the handle and the arm rest extend upward from a top surface of the base,
    wherein the handle and the arm rest are spaced apart in the longitudinal direction such that the handle is configured to be gripped by a hand of an arm of a user and the arm rest is configured to receive the arm as the user grips the handle with the hand,
    wherein the mount extends outward from a side surface of the base in a first direction transverse to the longitudinal direction, wherein the cable path between the drive wheel and the tension wheel extends parallel to the base in the longitudinal direction and is laterally offset from the base in the first direction, wherein the cable guide and the duct guide are disposed outward from the side surface of the base on the first direction, wherein the drive wheel is configured to be rotated by a rotatable handle, wherein the drive wheel is configured to rotate about a drive axis that extends in the first direction, and the drive wheel is configured to interact with the tension wheel upon rotation of the rotatable handle to propel the cable through the cable path and into the duct.

2. The pushing tool according to claim 1, wherein the pushing tool is a hand powered device that does not include a motor or a battery to feed the cable into the duct.

3. The pushing tool according to claim 1, wherein the drive axis intersects the base.

4. The pushing tool according to claim 1, further comprising hinge pins configured to couple the handle and the mount with the base.

5. The pushing tool according to claim 1, wherein the tension wheel is configured to rotate about a pin that is slidingly received in a slotted opening in the mount.

6. The pushing tool according to claim 5, wherein the tensioner further includes a connector configured to couple the actuator with the pin.

7. A pushing tool for feeding cable into a duct, the pushing tool comprising:

an elongated base having a length extending in a longitudinal direction from a first end to a second end;

an arm rest configured to be coupled at the first end of the base;

a mount configured to be coupled with the base proximate the second end;

a handle configured to be coupled with the base between the arm rest and the mount;

a drive wheel rotatingly coupled with the mount;

a tension wheel rotatingly coupled with the mount, the tension wheel being configured to cooperate with the drive wheel to form a cable path between the tension wheel and the drive wheel, the cable path being configured to receive the cable; and a tensioner coupled with the tension wheel, the tensioner including an actuator configured to adjust tension of the tension wheel on the cable being fed through the cable path, wherein the handle and the arm rest are spaced apart in the longitudinal direction such that the handle is configured to be gripped by a hand of an arm of a user and the arm rest is configured to receive the arm as the user grips the handle with the hand, wherein the mount extends outward from a side surface of the base in a first direction transverse to the longitudinal direction, wherein the cable path between the drive wheel and the tension wheel extends parallel to the base in the longitudinal direction and is laterally offset from the base in the first direction, wherein the drive wheel is configured to be rotated by a rotatable handle, wherein the drive wheel is configured to rotate about a drive axis that extends in the first direction, and the drive wheel is configured to interact with the tension wheel upon rotation of the rotatable handle to propel the cable through the cable path and into the duct.

8. The pushing tool according to claim 7, wherein the pushing tool is a hand powered device that does not include a motor or a battery to feed the cable into the duct.

9. The pushing tool according to claim 7, wherein the drive axis intersects the base.

10. The pushing tool according to claim 7, further comprising hinge pins configured to couple the handle and the mount with the base.

11. The pushing tool according to claim 7, wherein the tension wheel is configured to rotate about a pin that is slidingly received in a slotted opening in the mount.

12. The pushing tool according to claim 11, wherein the tensioner further includes a connector configured to couple the actuator with the pin.

13. A pushing tool for feeding cable into a duct, the pushing tool comprising:

an elongated base having a length extending in a longitudinal direction from a first end to a second end;

an arm rest configured to be coupled along the length of the base;

a mount configured to be coupled with the base;

a handle configured to be coupled with the base between the arm rest and the mount;

a drive wheel rotatingly coupled with the mount;

a tension wheel rotatingly coupled with the mount, the tension wheel being configured to cooperate with the drive wheel to form a cable path between the tension wheel and the drive wheel, the cable path being configured to receive the cable;

a tensioner coupled with the tension wheel, the tensioner including an actuator configured to adjust tension of the tension wheel on the cable being fed through the cable path;

wherein the handle and the arm rest are spaced apart in the longitudinal direction such that the handle is configured to be gripped by a hand of an arm of a user and the arm rest is configured to receive the arm as the user grips the handle with the hand, wherein the cable path between the drive wheel and the tension wheel extends parallel to the base in the longitudinal direction and is laterally offset from the base in a first direction, wherein the drive wheel is configured to be rotated by a rotatable handle, wherein the drive wheel is configured to rotate about a drive axis that extends in the first direction, and the drive wheel is configured to interact with the tension wheel upon rotation of the rotatable handle to propel the cable through the cable path and into the duct.

14. The pushing tool according to claim 13, wherein the pushing tool is a hand powered device that does not include a motor or a battery to feed the cable into the duct.

15. The pushing tool according to claim 13, wherein the drive axis intersects the base.

16. The pushing tool according to claim 13, further comprising hinge pins configured to couple the handle and the mount with the base.

17. The pushing tool according to claim 13, wherein the tension wheel is configured to rotate about a pin that is slidingly received in a slotted opening in the mount.

18. The pushing tool according to claim 17, wherein the tensioner further includes a connector configured to couple the actuator with the pin.

19. The pushing tool according to claim 13, further comprising a cable guide configured to guide the cable toward the cable path; and a duct guide configured to hold the duct, which is configured to receive the cable.

20. The pushing tool according to claim 13, wherein the base is configured to prevent the stationary handle, the arm rest, and the mount from rotating relative to the base,
wherein the stationary handle, the arm rest, and the mount are configured to be fixed along the length of the base during use of the tool, and
wherein the handle and the arm rest extend upward from a top surface of the base.

* * * * *